United States Patent [19]

Schmitt

[11] Patent Number: 4,618,940
[45] Date of Patent: Oct. 21, 1986

[54] ERROR CORRECTION SYSTEM FOR DIGITAL LENGTH OR ANGLE MEASURING INSTRUMENT

[75] Inventor: Walter Schmitt, Traunreut, Fed. Rep. of Germany

[73] Assignee: Dr. Johannes Heidenhain GmbH, Traunreut, Fed. Rep. of Germany

[21] Appl. No.: 459,376

[22] Filed: Jan. 20, 1983

[30] Foreign Application Priority Data

Jan. 26, 1982 [DE] Fed. Rep. of Germany ....... 3202339

[51] Int. Cl.[4] .................. G06F 15/36; G06G 7/18
[52] U.S. Cl. ...................................... 364/560; 73/1 R; 364/571
[58] Field of Search ............... 364/560, 571, 561, 481; 73/1 R, 1 E; 371/4, 5

[56] References Cited

U.S. PATENT DOCUMENTS

| | | | |
|---|---|---|---|
| 4,144,578 | 3/1979 | Mueller et al. | 364/571 |
| 4,225,931 | 9/1980 | Schwefel | 364/577 |
| 4,253,155 | 2/1981 | Freiday et al. | 364/571 |
| 4,295,201 | 10/1981 | Wiklund | 364/560 |
| 4,418,392 | 11/1983 | Hata | 364/571 |
| 4,424,700 | 1/1984 | Erickson et al. | 364/571 |
| 4,442,696 | 4/1984 | Erickson et al. | 73/1 E |

FOREIGN PATENT DOCUMENTS

| | | |
|---|---|---|
| 2729697 | 1/1979 | Fed. Rep. of Germany. |
| 2457376 | 12/1980 | Fed. Rep. of Germany. |
| 0013799 | 8/1980 | Japan. |

*Primary Examiner*—Errol A. Krass
*Assistant Examiner*—H. R. Herndon
*Attorney, Agent, or Firm*—Willian Brinks Olds Hofer Gilson & Lione Ltd.

[57] ABSTRACT

A digital electronic length or angle measuring instrument includes an arrangement for error correction. A signal generator delivers periodic analog reference signals $R_{S1}$, $R_{S2}$ which are compared in a comparator with scanning signals $S_1$, $S_2$ generated by the measuring instrument. In accordance with the result of the comparison in the comparator, the reference signals $R_{S1}$, $R_{S2}$ are altered as a function of correction data for symmetry, amplitude ratio, phase angle, and signal form, which correction data are determined in a correction component and are supplied to setting members included in the signal generator. In this way, an in dependence on the correction data, improved reference signals are generated which then form a basis for the next comparison in the comparator.

10 Claims, 2 Drawing Figures

ERROR CORRECTION SYSTEM FOR DIGITAL LENGTH OR ANGLE MEASURING INSTRUMENT

BACKGROUND OF THE INVENTION

The present invention relates to improvements to digital, electric, length or angle-measuring instruments of the type which include means for generating analog periodic primary measurement signals, and means for accommodating errors in phase, amplitude, and the like in these primary signals.

The resolution limit of such a measuring instrument is determined in part by the grid constant of the incremental division used. In the past, a number of attempts have been made to increase the resolution of measuring instruments to a value greater than that of the grid constant of the division. In particular, electronic means have been used for this purpose. When such interpolation is performed, it is important that the analog primary signals be as free of error as possible in order to allow accurate interpolation.

German DE-OS 27 29 697 discloses the use of a micro-computer to correct previously digitized analog signals and then to calculate interpolation values from the corrected analog signals. The calculating time of the micro-computer determines the maximum speed of movement in the measuring process when this approach is used.

SUMMARY OF THE INVENTION

The present invention is directed to an improved path measuring instrument which includes a system for correcting periodic analog signals, which system is relatively simple to connect, which provides high measuring speeds, and which allows constant, automatic correction if desired.

According to this invention, a digital position measuring instrument of the type comprising means for generating a plurality of analog, periodic primary signals is provided. This instrument includes signal generator means for generating a plurality of reference signals; comparator means, responsive to the plurality of primary signals and the plurality of reference signals, for comparing the primary and reference signals with respect to phase and amplitude; means, coupled to the generator means and the comparator means, for determining correction data for symmetry, amplitude ratio, phase angle, and signal form of the reference signals; and means for adapting the reference signals and the primary signals to one another in response to the correction data.

Further advantageous features of this invention are set forth in the attached dependent claims.

One of the important advantages of this invention is that the analog components required to implement the invention can be manufactured at substantially reduced expenditure as compared with certain prior art approaches. This invention provides improved reliability with respect to the evaluation of the signals, and it provides the possibility of stepwise correction through approximation of the faulty signals to the comparison signals.

The invention itself, together with further objects and attendant advantages, will best be understood by reference to the following detailed description taken in conjunction with the accompanying drawings.

DETAILED DESCRIPTION OF THE PRESENTLY PREFERRED EMBODIMENTS

Figure 1:
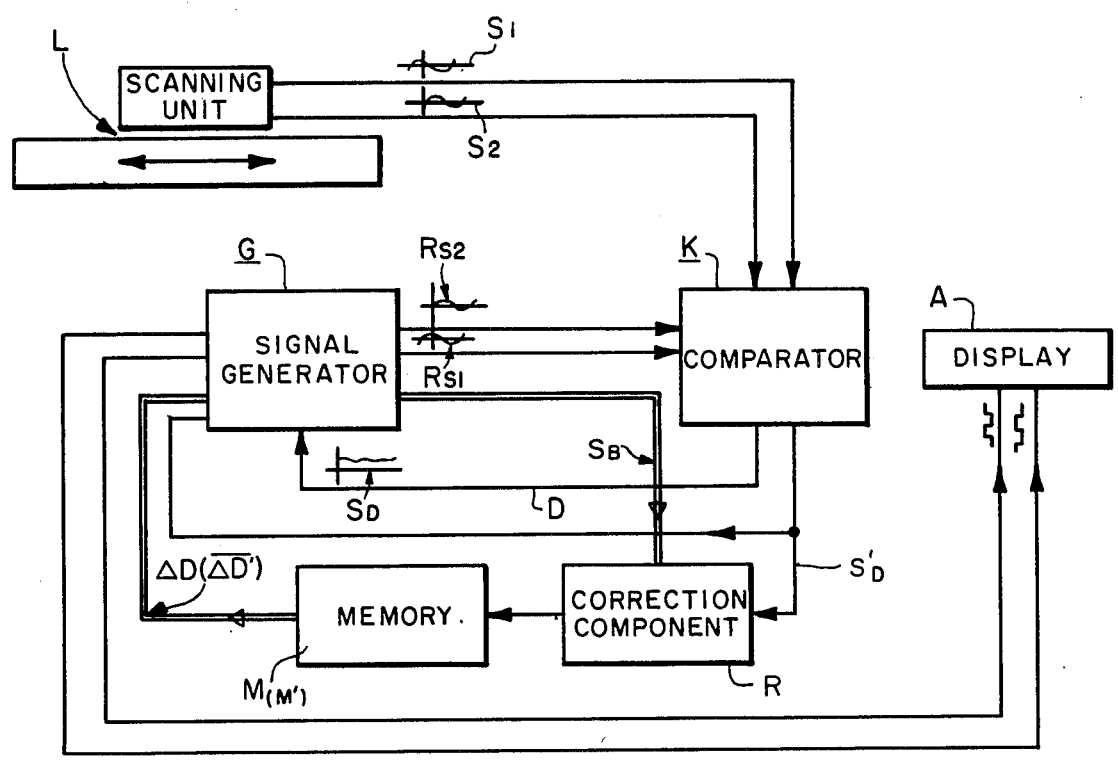
FIG. 1 is a simplified representation of a path-measuring instrument which includes a presently preferred embodiment of this invention.

Turning now to the drawings, FIG. 1 shows an incremental length measuring instrument L which generates two scanning signals $S_1$, $S_2$ in accordance with the relative movement of a first component of the instrument L with respect to a second component. These two scanning signals $S_1$ and $S_2$ are applied as inputs to a comparator K. The comparator K is connected with a signal generator G, which generates two reference signals $R_{S1}$ and $R_{S2}$ and feeds them as inputs to the comparator K. The analog reference signals $R_{S1}$ and $R_{S2}$ are digitally generated as described below in conjunction with FIG. 2. The comparator K acts to generate an analog control signal $S_D$ as a function of the result of the comparison between the scanning signals $S_1$ and $S_2$ and the reference signals $R_{S1}$ and $R_{S2}$, respectively. This control signal $S_D$ is applied via a control line D to an oscillator, which acts to generate a series of pulses in response to the control signal $S_D$, which pulses are applied as inputs to the signal generator G. In addition, the pulses are applied to an incremental counter which includes a numerical display A. In addition, a comparison dependent signal $S_D'$ is generated by the comparator K and is applied as an input to a correction component R. The correction component R also receives as input binary data $S_B$ from the signal generator G. The correction component R operates to determine from the inputs supplied by the signal generator G and the comparator K correction data $\Delta D$ for symmetry, amplitude ratio, phase angle, and signal form of the reference signals $R_{S1}$ and $R_{S2}$. These correction data $\Delta D$ S are applied to a memory device M. The signal generator G is coupled to the memory device M such that the generator G can read the stored correction data $\Delta D$ and generate therefrom new, improved reference signals $R_{S1}$, $R_{S2}$ which are modified from the previous values of these reference signals in accordance with the correction data $\Delta D$. In the next cycle, the modified, improved reference signals $R_{S1}$, $R_{S2}$ are applied to the comparator K for comparison so that an improved, comparison dependent signal $S_D'$ is generated and applied to the correction component R, which acts to modify the correction data $\Delta D$ which are applied to the signal generator G.

Figure 2:
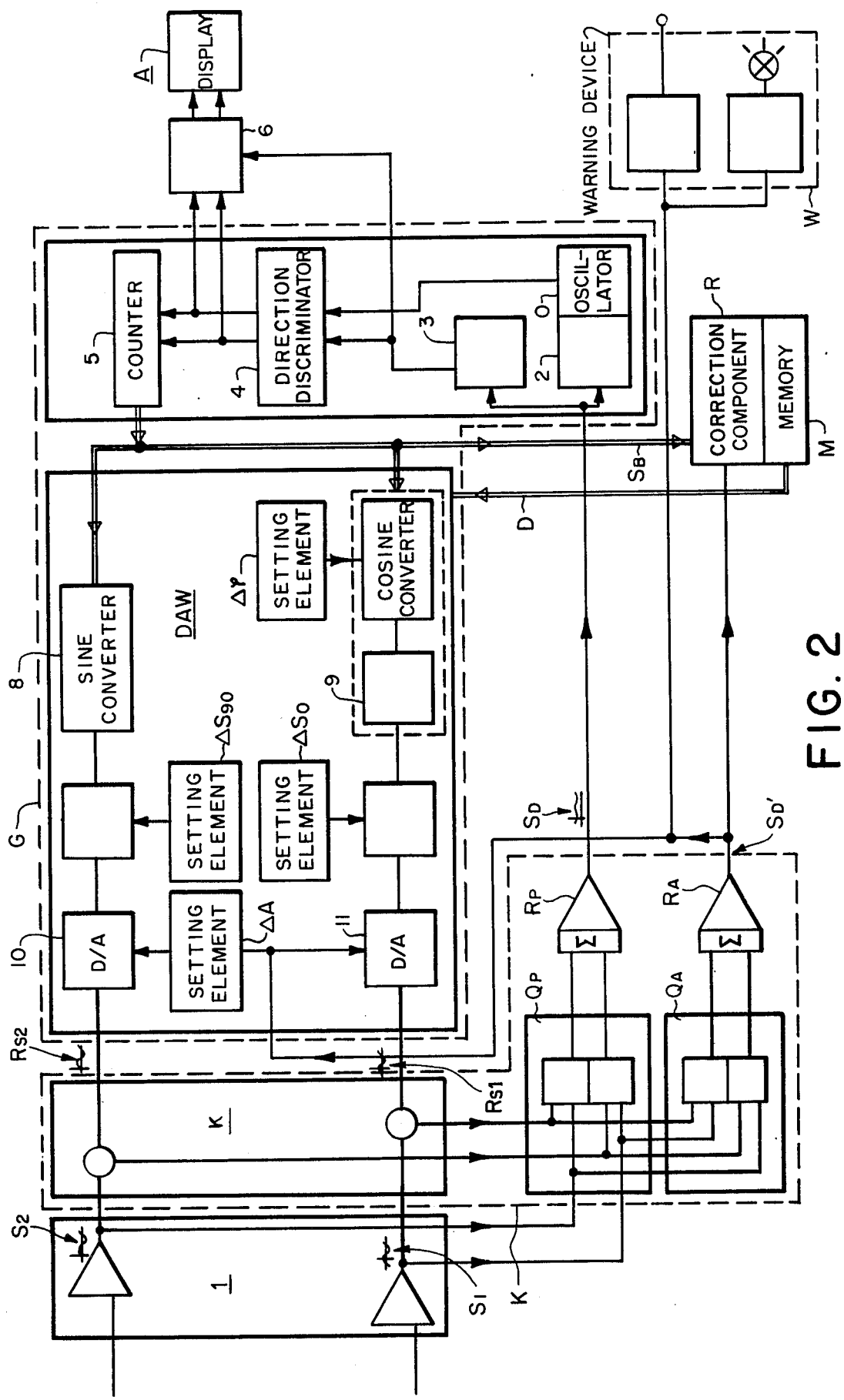
FIG. 2 is a detailed block diagram of portions of the embodiment of FIG. 1.

In this manner, the signals $S_1$, $R_{S1}$ and $S_2$, $R_{S2}$ can be adapted to one another in a stepwise fashion. FIG. 2 represents a detailed block diagram showing the manner in which signals are processed in the preferred embodiment of FIG. 1. As shown in FIG. 2, the scanning signals $S_1$ and $S_2$ are phase shifted with respect to one another by a phase angle of 90 degrees. This phase shift allows the direction of movement encoded in the scanning signals $S_1$, $S_2$ to be determined. The scanning signals $S_1$, $S_2$ are amplified in a scanning signal amplifier 1. The amplified analog scanning signals $S_1$ and $S_2$ are applied as inputs to the comparator K, in which they are compared with analog reference signals $R_{S1}$ and $R_{S2}$ with respect to momentary phase angle and monetary amplitude values.

The amplified scanning signals $S_1$ and $S_2$ are also applied as inputs to electronic components $Q_P$ and $Q_A$. These electronic components $Q_P$ and $Q_A$ also receive as additional inputs signals $\Delta S_1$ and $\Delta S_2$ which are generated by the comparator K as a result of the comparison of scanning signals $S_1$ and $S_2$ with reference signals $R_{S1}$ and $R_{S2}$. The electronic components $Q_P$ and $Q_A$ evaluate the input signals described above and carry out a quadrant evaluation of the signals, i.e., it is determined in what quadrant the determined difference between the scanning signals $S_1$ and $S_2$ and the reference signals $R_{S1}$ and $R_{S2}$ appears, and with what algebraic sign (+ or −) the particular difference amount must be acted upon. The quadrant evaluated signals are applied in each case to a regulating amplifier for the phase $R_P$ and the amplitude $R_A$. These regulating amplifiers $R_P$, $R_A$ act to generate control signals $S_D$ for phase and $S_D'$ for amplitude. The following formulas define the manner in which $S_D$ and $S_D'$ are determined:

$$S_D = S_1 \cdot \Delta S_2 + S_2 \cdot \Delta S_1;$$

$$S_D' = S_1 \cdot \Delta S_1 + S_2 \cdot \Delta S_2.$$

The control signal $S_D$ for phase is supplied to the signal generator G and is examined in the signal generator G by components 2 and 3. Component 2 generates an output signal indicative of the magnitude of the control signal $S_D$, and component 3 generates an output signal indicative of the polarity of the control signal $S_D$. The output of the component 2 is applied in the form of a voltage to the oscillator O, which acts to generate a series of pulses which are applied to a direction discriminator 4. The direction discriminator 4 also receives the signal from the component 3 indicative of the direction of counting. The pulses supplied to the direction discriminator 4 appear on one of two output terminals of the direction discriminator 4 in accordance with the direction of counting. Pulses on these two outputs are applied to the forward and backward counting inputs of a counter 5 and are applied as inputs to a so-called standstill logic component 6 which receives also direction information from the component 3. The device 6 is operative to prevent changes of only a single pulse from reaching the display A after a reversal of the counting direction (as from forward counting to reverse counting for example), such that only changes greater than two counting pulses are passed after such a reversal. In this way, jitter introduced by the phase regulating circuit of ±1 counting pulse is isolated from the display A. The pulses which pass through the standstill logic component 6 are counted in an incremental counter which includes a numerical display A which acts to display the measured count.

Information as to the measured count, which corresponds to the increment of travel between the two components of the length measuring instrument L, is obtained by a constant comparison between the scanning signals $S_1$, $S_2$ and the reference signals $R_{S1}$ and $R_{S2}$, respectively.

The counter 5 receives as inputs the digital pulses generated by the oscillator O and acts to maintain a count of these pulses. On the assumption that the period of the analog scanning signals $S_1$ and $S_2$ is to be subdivided by a factor of 100, the counter 5 establishes the subdivision factor at N=100. That is, one hundred digital pulses of the oscillator O are required to cause the counter 5 to cycle through one complete cycle.

The signal generator G which generates the reference signals $R_{S1}$ and $R_{S2}$ applies the reference signals $R_{S1}$, $R_{S2}$ continuously to the respective inputs of the comparator K. The signal generator G is arranged such that each of the reference signals $R_{S1}$ and $R_{S2}$ cycles through a complete period when the counter 5 counts 100 pulses generated by the oscillator O. In order to ensure this result, the signal generator G includes a digital to analog converter DAW, which is constructed in such a way that it generates an output analog signal which is dependent on the binary input data supplied by the counter 5. In this preferred embodiment, the digital to analog converter DAW includes a sine converter 8 and a cosine converter 9, which serve to produce output signals proportional to the sine and cosine, respectively, of the numbers stored in the counter 5. The output signals generated by the sine and cosine converters 8,9 are applied to respective digital to analog converters 10,11, which generate the reference signals $R_{S2}$, $R_{S1}$, respectively.

As explained above, the number of pulses generated by the oscillator O is dependent upon the control signal $S_D$ that is generated as a result of the comparison between the scanning signals $S_1$ and $S_2$ and the respective reference signals $R_{S1}$, $R_{S2}$. The momentary values of the reference signals $R_{S1}$, $R_{S2}$ are therefore dependent on the result of the comparison between the scanning signals $S_1$, $S_2$ and the reference signals $R_{S1}$, $R_{S2}$.

The function and operation of the circuit shown in block diagram form in FIG. 2 can now be described as follows. For the purposes of this explanation, it will be assumed that a movable part of the measuring instrument L has been moved through a selected interval, and that the values of the analog signals $S_1$, $S_2$ applied as inputs to the comparator K do not agree with the momentary values of the reference signals $R_{S1}$, $R_{S2}$ on the other inputs of the comparator K. The comparison between $S_1$ and $R_{S1}$ and $R_{S2}$, respectively, therefore generates difference signals $\Delta S_1$ and $\Delta S_2$ which are processed in the components $Q_P$ and $Q_A$ in such a way that in the regulating amplifier $R_P$ there is generated a phase control signal $S_D$ and in the regulating amplifier $R_A$ is generated an amplitude control signal $S_D'$. The two control signals $S_D$, $S_D'$ correspond to and vary as a function of the difference between the momentary values of the signals $S_1$, $R_{S1}$ and $S_2$, $R_{S2}$.

The magnitude of the control signal $S_D$ which is applied as a voltage to the oscillator O causes the oscillator O to generate a number of pulses. In this embodiment, the number of pulses generated by the oscillator O corresponds to the distance (in units of one-one hundredth of the length of the period P of the grid scale) through which the movable part of the measuring arrangement L was moved, since for a complete signal period 100 pulses of the oscillator O are required.

These pulses generated by the oscillator O are, after direction determination, applied (1) to the numerical incremental counter of numerical display A which indicates the total number of pulses and (2) to the counter 5. The counter 5 maintains a count of the pulses generated by the oscillator O and applies this count in the form of binary information to the digital to analog converter DAW. In response, the digital to analog converter DAW generates revised values for the two reference signals $R_{S1}$ and $R_{S2}$ which are more nearly equal to the scanning signals $S_1$, $S_2$, respectively, applied to the other inputs of the comparator K. Because of the revision to the reference signals $R_{S1}$, $R_{S2}$, $R_{S1}$ is equal to the scanning signal $S_1$ and $R_{S2}$ is equal to the scanning signal $S_2$. That is, $\Delta S_1$ and $\Delta S_2$ are both equal to zero. Accordingly, the control signal $S_D$ goes to zero and the oscillator O is prevented from generating further pulses. The process described above goes on continuously so that the result displayed in the display A constantly corresponds to the measured position of the two parts of the measuring instrument L. The resolution of this displayed result is in this preferred embodiment 100 times greater than the grid constant of the incremental grid included in the measuring instrument L.

The regulating amplifier $R_A$ for amplitude generates a comparison dependent control signal $S_D'$ for the readjustment of the amplitudes of the reference signals $R_{S1}$, $R_{S2}$. This control signal $S_D'$ is also applied as an input to the digital to analog converter DAW and, with the aid of a reference voltage, causes the momentary values of the amplitudes of the reference signals $R_{S1}$ and $R_{S2}$ to be made equal to the momentary values of the amplitudes of the scanning signals $S_1$ and $S_2$. For this, a quadrant evaluation is carried out in the component $Q_A$, as explained above.

In addition, the signal $S_D'$ is supplied to a correction component R which also receives as a data input the counting result of the counter 5 in the form of binary data. Based on the course of the signal $S_D'$ and the binary data mentioned above, correction data $\Delta D$ are determined in the correction component R and stored in a memory device M according to the following formulas:

$$S_1 = A \sin(x + \Delta\phi) + \Delta S_0;$$

$$S_2 = (A + \Delta A) \cos(x) + \Delta S_{90};$$

$$S_D' = \sqrt{S_1^2 + S_2^2}.$$

These correction data $\Delta D$ can be supplied on command or automatically in each cycle (from period to period of the signals) to the signal generator G. The signal generator G includes corresponding setting members $\Delta S_0$, $\Delta S_{90}$, $\Delta A$ which operate to modify the reference signals $R_{S1}$ and $R_{S2}$ as a function of the correction data $\Delta D$ in order to conform the reference signals $R_{S1}$, $R_{S2}$ to the scanning signals $S_1$, $S_2$.

In order to prevent fluctuations in the signal course, which could cause short term, severe deviations of the signals from one another, it is provided to determine correction data $\Delta D'$ over several signal periods and to store the resulting mean values $\overline{\Delta D'}$ in the memory device M', and then to supply this mean value of the correction data $\overline{\Delta D'}$ to the setting members $\Delta S_0$, $\Delta S_{90}$, $\Delta\phi$, $\Delta A$.

In addition, it lies within the scope of this invention to provide setting members $\Delta S_0$, $\Delta S_{90}$, $\Delta\phi$, $\Delta A$ in the amplifier 1 and to adapt the primary signals $S_1$, $S_2$ to the reference signals $R_{S1}$, $R_{S2}$. This involves merely a reversal of polarity to perform the desired correction in reciprocal fashion.

As already described, the correction of the signals can take place automatically or on command. This involves applying the correction data $\Delta D$ determined as described above to the signal generator G until one or more of the momentarily prevailing correction data exceeds respective predetermined thresholds. When this occurs, the warning device W generates a warning signal and causes new correction values $\Delta D$ to be determined, stored in the memory M, and applied to the signal generator G.

The following details are provided merely by way of example to explain the types of components that can be used to construct the embodiment of FIG. 2: components $Q_A$, $Q_B$ can be analog multipliers such as Motorola MC1496; comparator K can be a comparator of resistances in which $\Delta S_1$ and $\Delta S_2$ are both zero in the balanced state; components $R_P$, $R_A$, and 1 can be operational amplifiers such as National Semiconductor LM 348; component 2 can be an operational amplifier such as National Semiconductor LM 348 circuited to provide an output which is the absolute value of the input; component 3 can be a voltage comparator such as National Semiconductor LM 339 circuited to provide an output indicative of the polarity of the input; oscillator O can be a voltage to frequency converter such as Raytheon 4151; counter 5 can be an up-down counter such as Texas Instruments SN 74192; converters 8 and 9 can be PROMS such as Texas Instruments TBP 28 L 22; components 10, 11 can be digital to analog converters such as National Semiconductor DAC 0800.

In addition, by way of example only, the following components can also be used: the component $\Delta A$ (the setting member for amplitude balancing) can be formed from a National Semiconductor LM 348; the component $\Delta\phi$ (the setting member for phase balancing) can be executed by special programming of component 9; the components $\Delta S_0$, $\Delta S_{90}$ (the setting members for symmetry balancing) can take the form of digital adders or digital to analog converters with analog adders; the memory M can take the form of a Texas Instrument SN 74001; the correction component R can take the form of a sample and hold circuit such as National Semiconductor LF 398 with a suitable resistance network; the component W can be a National Semiconductor LM 339 for example.

Of course, it should be understood that a wide range of changes and modifications to the preferred embodiments described above will be apparent to those skilled in the art. It is therefore intended that the foregoing detailed description be regarded as illustrative rather than limiting, and that it would be understood that it is the following claims, including all equivalents, which are intended to define the scope of this invention.

I claim:

1. In a digital position measuring instrument of the type comprising means for generating a plurality of analog, periodic primary signals indicative of the relative position of a first object with respect to a second object, the plurality of primary signals defining a set of primary signals, the improvement comprising:

signal generator means for generating a plurality of reference signals, the plurality of reference signals defining a set of reference signals, each reference signal associated with a respective one of the primary signals;

comparator means, responsive to the plurality of primary signals and the plurality of reference signals, for comparing the primary and the respective reference signals with respect to phase and amplitude;

correction means, coupled to the generator means and the comparator means, for determining correction data for symmetry, amplitude ratio, phase angle, and signal form of the reference signals; and means, responsive to the correction means, for adapting one of (1) the set of reference signals and (2) the set of primary signals to correspond to the other of (1) the set of reference signals and (2) the set of primary signals in response to the correction data.

2. The invention of claim 1 wherein the generating means, the comparator means, the correction means, and the adapting means form a regulating circuit which maintains the reference signals in correspondence with the primary signals.

3. The invention of claim 1 wherein the correction means operates to determine the correction data for at least one period of the reference signals and to store the correction data in a memory device, and wherein the adapting means operates to modify the reference signals in response to the stored correction data and to apply the modified reference signals to the comparator means.

4. The invention of claim 1 wherein the correction means operates to determine the mean values of the correction data over several periods of the reference signals and to store the mean values in a memory device, and wherein the adapting means operates to modify the reference signals in response to the stored mean values and to apply the modified reference signals to the comparator means.

5. The invention of claim 3 wherein the determination of the correction data and the resulting correction of the reference signals occurs stepwise from period to period.

6. The invention of claim 1 wherein the adapting means adjusts the reference signals to correspond to the primary signals.

7. The invention of claim 1 further comprising:
   means for generating a warning signal when the correction data indicate corrections greater than respective pre-selected thresholds.

8. The invention of claim 7 wherein the invention further comprises:
   a memory device coupled to the adapting means, and
   means for storing the correction data in the memory device in response to the warning signal.

9. The invention of claim 1 wherein the adapting means comprises means for continuously maintaining the reference signals in phase with respective ones of the primary signals.

10. The invention of claim 9 wherein the maintaining means comprises means for supplying a digital indication of the phase angle of at least one of the reference signals as an interpolation of the primary signals.

* * * * *

UNITED STATES PATENT AND TRADEMARK OFFICE
CERTIFICATE OF CORRECTION

PATENT NO. : 4,618,940                               Page 1 of 2
DATED     : October 21, 1986
INVENTOR(S) : Walter Schmitt It is certified that error appears in the above-identified patent and that said Letters Patent is hereby corrected as shown below:

Title page:

IN THE REFERENCES CITED -
FOREIGN PATENT DOCUMENTS

In Fed. Rep. of Germany reference No. 2729697, please delete the date "1/1979" and substitute therefor --7/1977--;

In Japan reference No. 0013799, please delete the date "8/1980" and substitute therefor --12/1978--.

IN THE DETAILED DESCRIPTION OF
THE PRESENTLY PREFERRED EMBODIMENTS

In column 2, line 67, please delete "monetary" and substitute therefor --momentary--;

In column 4, line 38, please delete "between $S_1$ and $R_{S1}$ and $R_{S2}$" and substitute therefor --between $S_1$ and $R_{S1}$ and $S_2$ and $R_{S2}$--;

UNITED STATES PATENT AND TRADEMARK OFFICE
CERTIFICATE OF CORRECTION

PATENT NO. : 4,618,940

DATED : October 21, 1986

INVENTOR(S) : Walter Schmitt

It is certified that error appears in the above-identified patent and that said Letters Patent is hereby corrected as shown below:

In column 5, line 43, please delete " $\Delta S_{9O}$, $\Delta A$" (the letter "O" being in italics) and substitute therefor -- $\Delta S_{90}$, $\Delta \emptyset$, $\Delta A$ -- (the "0" being a numeral);

In column 5, line 53, please delete " $\Delta S_{9O}$" (the letter "O" being in italics) and substitute therefor -- $\Delta S_{90}$ -- (the "0" being a numeral);

In column 5, line 56, please delete " $\Delta S_{9O}$" (the letter "O" being in italics) and substitute therefor -- $\Delta S_{90}$ -- (the "0" being a numeral).

Signed and Sealed this

Twenty-seventh Day of December, 1988

Attest:

DONALD J. QUIGG

*Attesting Officer*     *Commissioner of Patents and Trademarks*